United States Patent [19]
Hofacre et al.

[11] Patent Number: 5,934,652
[45] Date of Patent: Aug. 10, 1999

[54] AIR SPRING BUMPER AND METHOD OF MOUNTING

[75] Inventors: Gregory Dean Hofacre, Canton; Mark Guy Trowbridge, Stow; Carl Kenneth Safreed, Jr., North Canton, all of Ohio

[73] Assignee: The Goodyear Tire & Rubber Company, Akron, Ohio

[21] Appl. No.: 09/085,936

[22] Filed: May 28, 1998

[51] Int. Cl.[6] .............................. F16M 1/00; F16M 3/00
[52] U.S. Cl. .................................. 267/64.27; 267/64.23; 411/171
[58] Field of Search ............................. 267/64.21, 64.23, 267/64.24, 64.27, 122, 140, 152, 153; 280/124.158–124.161; 248/615, 632, 634, 635, 636, 638; 411/171

[56] References Cited

U.S. PATENT DOCUMENTS

| | | | |
|---|---|---|---|
| 3,038,717 | 6/1962 | Bank | 267/64.24 |
| 3,063,704 | 11/1962 | Moody | 267/64.24 |
| 3,263,985 | 8/1966 | Planta | 267/141.4 |
| 3,447,814 | 6/1969 | Erwin-Walter-Siber et al. | 267/141.4 |
| 3,475,015 | 10/1969 | Hirst | 267/64.24 |
| 3,682,464 | 8/1972 | Krejcir | 267/64.24 |
| 4,506,910 | 3/1985 | Bierens | 280/711 |
| 4,787,606 | 11/1988 | Geno et al. | 267/64.27 |
| 4,798,369 | 1/1989 | Geno et al. | 267/64.11 |
| 5,201,500 | 4/1993 | Ecktman et al. | 267/140 |
| 5,382,006 | 1/1995 | Arnold | 267/64.27 |
| 5,535,994 | 7/1996 | Safreed, Jr. | 267/64.27 |

*Primary Examiner*—Chris Schwartz
*Attorney, Agent, or Firm*—Nancy T Krawczyk

[57] ABSTRACT

An air spring with a pair of spaced end members and a flexible elastomeric sleeve forming a pressurized chamber in combination with the end members is disclosed. The air spring is provided with an internal bumper to absorb impacts and prevent collapse of the air spring when in operation. The bumper is formed with a continuous ledge in the central opening. Securing the bumper to one of the end members is a hollow cup. The cup lip engages the bumper ledge and the cup is attached to the end member.

13 Claims, 3 Drawing Sheets

AIR SPRING BUMPER AND METHOD OF MOUNTING

TECHNICAL FIELD

The disclosed invention relates to air springs. In particular, the invention is directed towards an improved mounting of an internal bumper for an air spring.

BACKGROUND OF THE INVENTION

Air springs have been used for motor vehicles and various machines and other equipment for a number of years. The springs provide cushioning between movable parts, primarily to absorb shock loads imparted thereon. The air spring usually consists of a flexible elastomeric reinforced sleeve which extends between a pair of end members. The sleeve is attached to the end members to form a pressurized chamber therein. There may be one or more pistons located within the flexible sleeve. The end members mount the air spring on spaced components or parts of the vehicle or equipment on which the air spring is to be mounted.

The internal pressurized fluid, generally air, absorbs most of the shock impressed upon or experienced by one of the spaced end members by which the air spring is mounted. The end members move inwards and towards each other and also away and outwards from each other upon absorbing the imparted shock.

To prevent the end members from contacting each other during inward movement, many prior art springs have internal bumpers mounted on one of the end members. The bumper extends into the interior of the pressurized chamber. The bumper prevents total collapse or deflection of the spring member in the event of air spring failure, and absorbs shock upon the spring experiencing severe shocks and deflections.

Examples of prior art spring bumpers include U.S. Pat. No. 3,475,015. The bumper therein is molded onto the plate.

U.S. Pat. No. 4,787,606 discloses a bumper which is pressed over a solid central post on the lower spring plate.

U.S. Pat. No. 5,201,500 discloses a bumper with fingers molded into the plastic which snaps over a mushroom head bumper nut. However, repeated and/or excessive forces may result in the bumper fingers being cracked or broken.

The disclosed invention is directed toward an improved method of mounting the air spring bumper. Greater shear strength for the bumper is realized due to the inventive securing means.

SUMMARY OF THE INVENTION

An object of the present invention is to provide an improved air spring construction for motor vehicles and other types of equipment comprising spaced end members and an internal bumper which absorbs shock upon the air spring experiencing severe deflections, and prevents the spring from total collapse.

Another object of the present invention is to provide an improved method of mounting a bumper inside of an air spring.

Another object of the present invention is to provide an air spring with improved strength and integrity of the bumper mount while decreasing the total weight of the assembly. Additionally the bumper cannot vibrate loose and has greater shear strength.

These objects are obtained by the disclosed air spring which is comprised of a pair of spaced end members, an elastomeric sleeve engaged with the end members, and the inventive bumper mounted on one of the spaced end members. The bumper is formed with a central opening and within the opening is a continuous ledge. The bumper is attached to either of the end members by securing means engaging the bumper ledge.

In another aspect of the disclosed invention, the inventive bumper is secured to an end member of the air spring by a securing cup. The cup has a base at one end and a continuous lip at the opposing open-end.

In a another aspect of disclosed invention, the bumper is secured to the end member of the air spring by means which engages the bumper ledge, and the means is fixedly attached to the end member.

In a further aspect of the disclosed invention, the securing means is welded to the end member.

Another object of the disclosed invention is the method of assembly of an improved air spring. The method of assembly includes forming the inventive bumper with a central opening and a continuous ledge within the opening; locating means in the bumper opening so as to engage the ledge; and securing the means to one of a pair of spaced end members.

A further aspect of the disclosed method of assembly includes providing a securing means in the shape of a cup. The cup has a base at one end and a continuous lip at the opposing end.

A further aspect of the inventive method of assembly includes welding of the securing means to the end member to attach the bumper within the air spring.

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
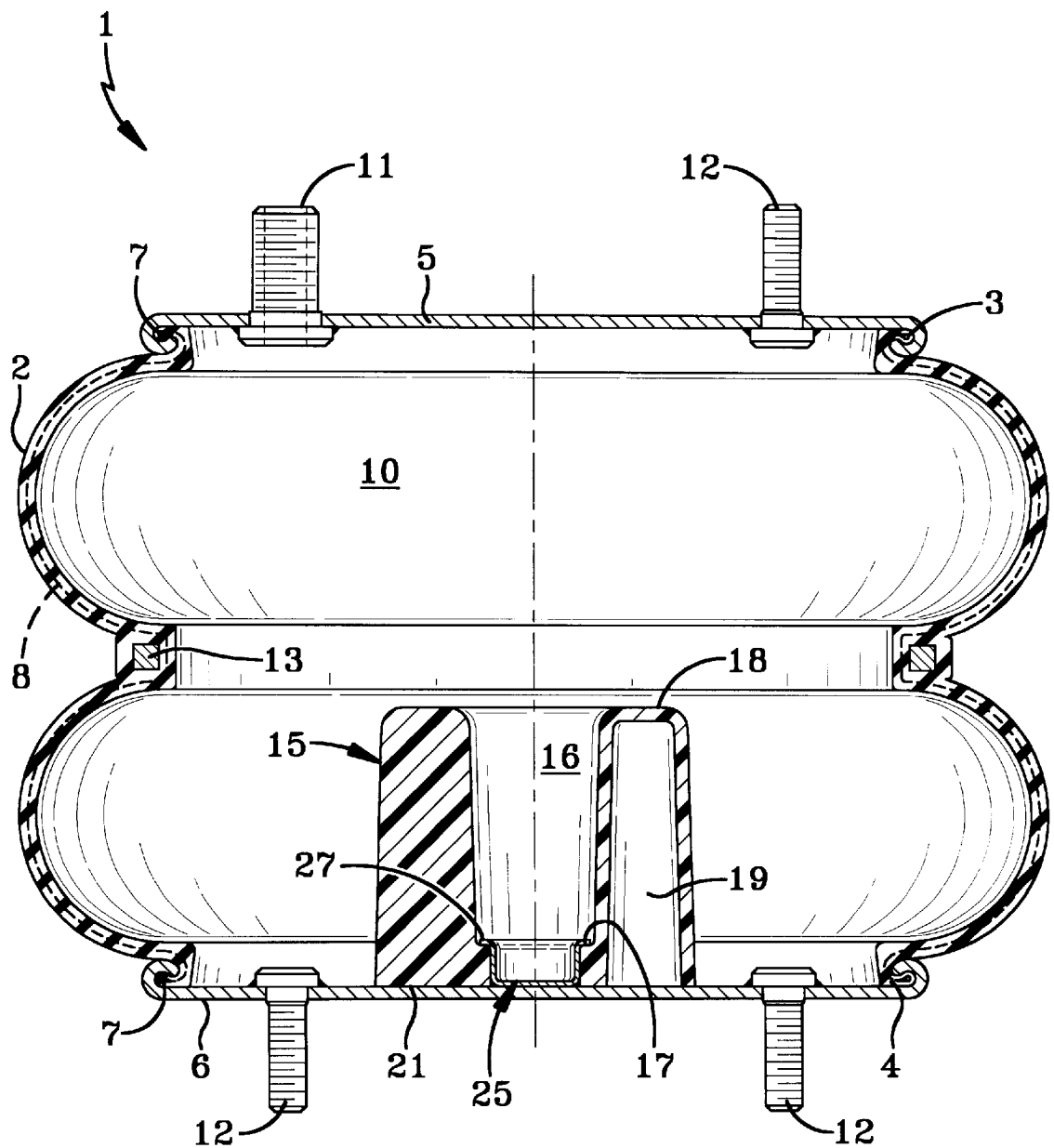
FIG. 1 is a bellows air spring with the inventive bumper.

FIG. 1 is illustrative of the inventive bumper mounted within a bellows air spring 1. An elastomeric sleeve 2 is sealingly engaged at both ends to end plates. The upper end 3 is attached to an upper end plate 5. The opposing end 4 is attached to lower end plate 6. Each end 3, 4 of the sleeve 2 may be provided with beads 7 to enhance the attachment of the sleeve 2 to the end plates. The beads 7 may be steel cable wires, as well as other known conventional air spring bead construction materials. The sealing arrangement of the upper and lower ends 3, 4 creates a pressurized chamber 10 within the air spring 1. The sleeve 2 may be provided with a reinforcing layer 8 to provide additional strength to the sleeve 2.

The upper end plate 5 has a combination stud 11 permitting the fluid to flow into the pressurized chamber 10. The preferred fluid introduced into the spring 1 is air. The upper end plate 5 is also provided with a mounting stud 12. The lower end plate 6 may also be provided with two mounting studs 12, on opposing sides of a bumper 15 mounted on the lower end plate 6. The bumper 15 is mounted, ideally, in the center of the lower end plate 6. The bumper 15 is secured to the end plate 6 by the cup 25.

Figure 3:
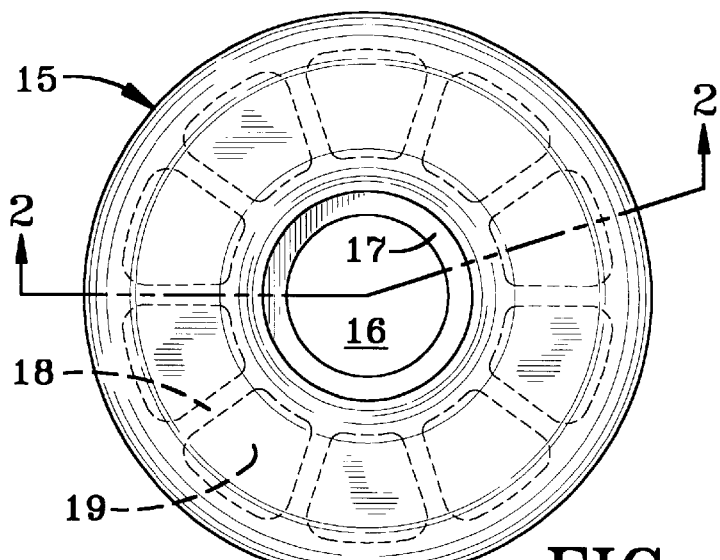
FIG. 3 is a top view of the bumper.
Figure 2:
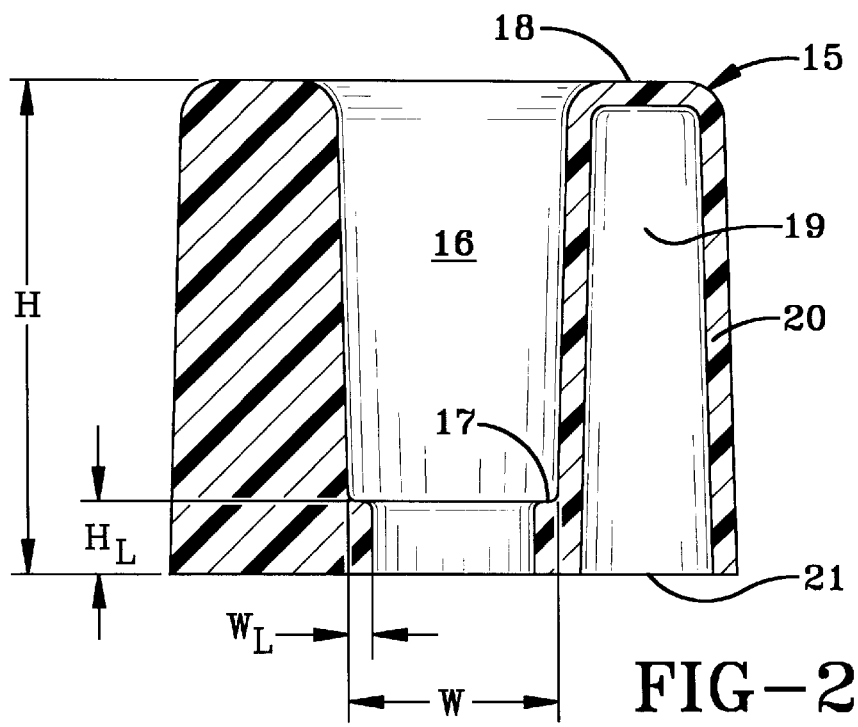
FIG. 2 is a cut view of the inventive bumper.

As seen in more detail in FIG. 2 and 3, the bumper 15 is a one piece member, formed of a suitable elastomeric, plastic, thermoset, or other suitable polymer. The bumper 15 has a central opening 16. The central opening 16 has two differing diameters, the transition point between the differing diameters is instantaneous, forming a substantially straight ledge 17 when viewed in cross section. The central opening 16 may also gradually decrease in diameter, forming an angled ledge 17, in order to achieve different contact forces between the ledge 17 and the securing cup 25. The transition point in diameters occurs at an illustrative height Hl of 15% of the bumper height H. The transition point may be at a height $H_L$ within the range of 5% to 75% of the bumper height H.

The width $W_L$ of the ledge 17 is within the range of 5% to 35% of the central opening width W. Preferably the ledge width Wl is equivalent to the thickness of the bumper walls 20, as discussed below.

The top 18 of the bumper 15 is a continuous surface, except for the central opening 16, as seen in FIG. 3. The body of the bumper is provided with a plurality of openings 19. The illustrative bumper is provided with ten openings 19; however, the number and size of the openings 19 may vary depending on the desired spring characteristics of the bumper 15. The number and size of the openings 19 is determinative of the thickness of the bumper walls 20. The bottom surface of the bumper is non-continuous as the openings 19 extend the full depth of the bumper 15. The bumper may also be a solid construction with no openings 19 except for the central opening 16.

Figure 4:
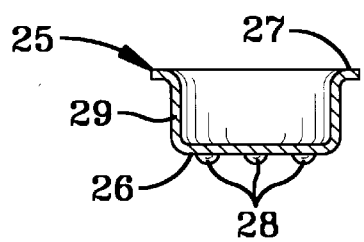
FIG. 4 is a cut view of the weld cup.

The securing means for the bumper 15 to the end plate 6 is the hollow cup 25, illustrated in FIG. 4. The illustrated embodiment of the cup 25 has a solid base 26, an extending lip 27 at the upper edge, and a main body 29. The height and width of the cup lip 27 are selected to mate with the height and width of the continuous ledge 17 of the bumper 15.

Attachment of the inventive bumper 15 and securing means 25 is accomplished by first dropping the cup 25 into the central opening 16 of the bumper 15, the progress of the cup 25 being halted by the bumper ledge 17 when the cup lip 27 engages the ledge 17. The partially assembly unit is then located on an end plate in the desired location. The cup 25 is welded onto the end plate 6, securing the bumper 15 to the end plate 6. Weld contact points 28 may be provided on the underside of the cup base 26 to provide for material to effect the weld. Upon welding, the contact points 28 melt flat between the cup base 26 and the end plate 6, as seen in FIG. 1.

Attachment of the inventive bumper may also be accomplished by first welding the cup 25 to the end plate 6 in the desired location. The central opening 16 of the bumper 15 is then aligned with the cup 25 and the bumper 15 is pressed down over the cup 25 so the cup lip 27 engages the ledge 17. The remainder of the air spring 1 is assembled in the conventional manner.

The inventive cup 25 is disclosed as being welded to the end plate 6, however, the cup 25 may also be secured to the end plate by other techniques. The cup 25 may be formed as an integral part of the end plate 6. The cup 25 may be secured to the end plate 6 by a threaded bolt, or other similar means. Furthermore, the cup 25 may also be formed of materials such as stamped or pressed metal or a thermoplastic capable of withstanding the generated internal temperature of the air spring 1. Additionally, to reduce the materials of construction, in conjunction with any of the disclosed alternatives, the base 26 of the cup 25 may be formed with at least one opening, thereby the bumper securing means more resembles a grommet than a cup. With such a construction, any weld contact points 28 will be located closer to the main body 29 of the securing means, or along the edge of any base 26 portion remaining.

The bellows air spring of FIG. 1 is provided with a bead 13 at the mid-length of the sleeve 2. During operation of the air spring 1, when force is exerted upon either the upper 5 or the lower 6 end plate, the upper portion of the sleeve 2 and the lower portion of the sleeve 2 axially expand, while decreasing in height, akin to a bellows action. However, if the force exerted upon the end plates is high, forcing the overall sleeve height to be substantially reduced, the upper end plate 5 makes contact with the top of the bumper 18. In this air spring 1, the bumper 15, conversely, may be mounted on the upper end plate 5. During operation, the lower end plate 6 would make contact with the top surface of the bumper 18.

Figure 5:
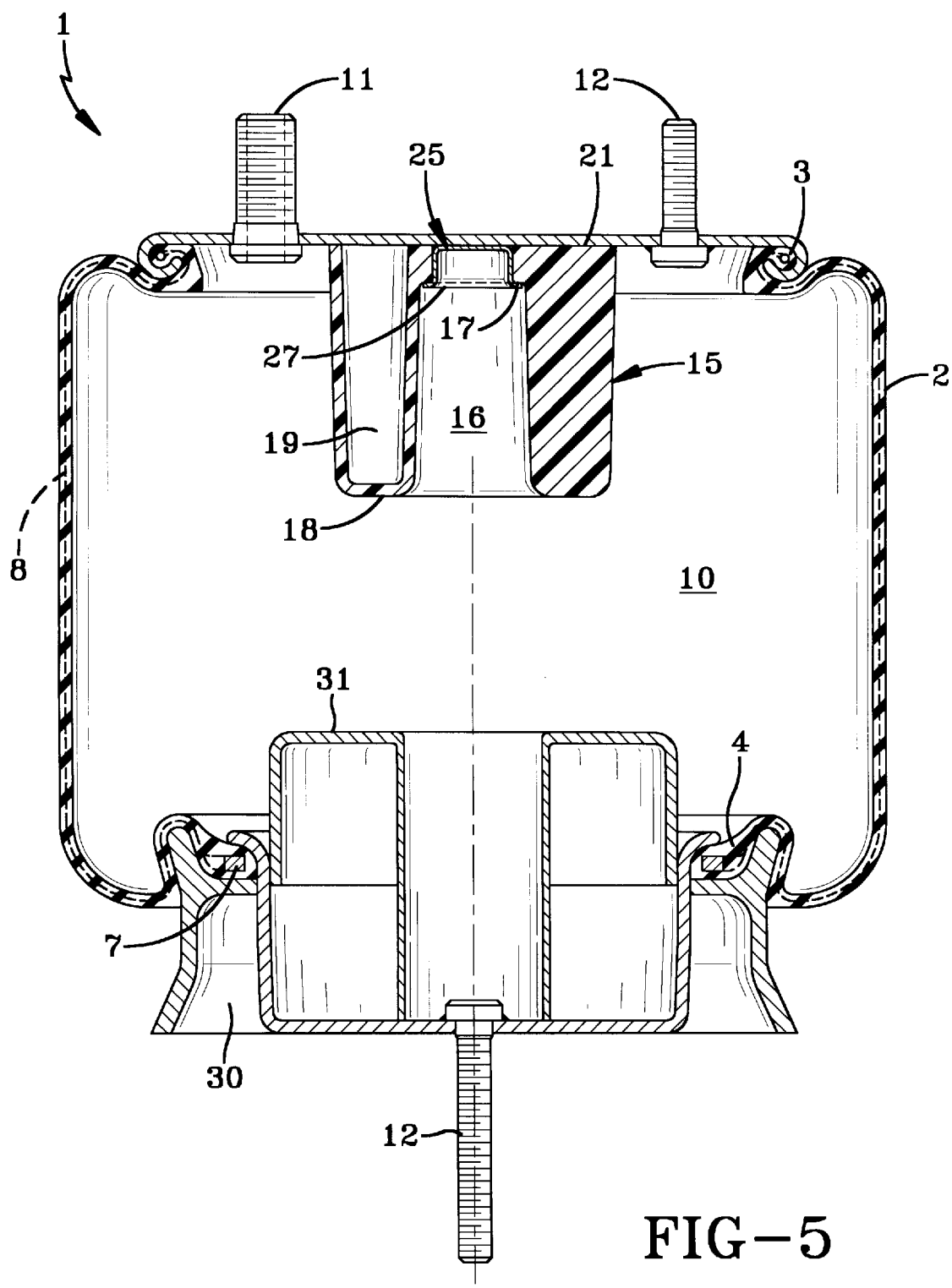
FIG. 5 is a rolling lobe air spring with the inventive bumper.

The inventive bumper 15 may be employed in other types of air spring constructions, such as a rolling lobe air spring. FIG. 5 illustrates one such air spring. The air spring 1 is comprised of a sleeve 2, a piston 30, a lower retainer 31 and an upper retainer 5. The elastomeric sleeve 2 is attached to the upper 5 and lower 31 retainers. Retention of the sleeve 2 is by any conventional means, including beads 7 embedded within the sleeve ends or the use of conventional retaining rings. In the rolling lobe air spring 1, the inventive bumper 15 is mounted on the upper retainer 5.

The combination of the inventive bumper 15 with its continuous ledge 17 and securing means 25 to engage the ledge 17 results in an improved mounting of the bumper 15 within the air spring 1. The bumper 15 exhibits a higher shear strength and thus is capable of withstanding higher impact forces than conventional bumpers. Additionally, the hollow nature of the securing means 25 assists in minimizing the weight of the air spring.

This improved air spring is useful in automobiles, trucks, buses and any other application in which conventional air springs are used.

Variations in the present invention are possible in light of the description of it provided herein. While certain representative embodiments and details have been shown for the purpose of illustrating the invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An air spring comprising a pair of spaced end members, a sleeve engaged with the end members, a bumper mounted on one of the spaced end members, the bumper having a central opening, the opening being formed with a continuous ledge, and a hollow cup-shaped securing means positioned in the opening, having means for engaging the ledge, the hollow means being secured to the end member.

2. An air spring in accordance with claim 1 wherein the cup-shaped securing means has a base at one end and a continuous lip at the opposing open-end.

3. An air spring in accordance with claim 2 wherein the lip of the cup-shaped securing means engages the continuous ledge of the bumper.

4. An air spring in accordance with claim 1 wherein the securing means is welded to the end member.

5. An air spring comprising a pair of spaced end members, a flexible sleeve formed of an elastomeric material sealingly engaged with the end members, a shock absorbing bumper mounted on one of the spaced end members, and bumper securing means, the bumper and securing means being characterized by the bumper being formed of a one-piece member with a central opening, the central opening being formed with a continuous ledge;

the securing means being a cup-shaped member being defined by a continuous base and a continuous lip at the open end of the cup-shaped member;

the securing means being located in the central opening of the bumper, the lip of the securing member engaging the continuous ledge of the bumper, and the cup base being welded to the end member, securing the bumper to the end member.

6. A method of forming an air spring comprising a pair of spaced end members, a sleeve, a bumper, and bumper securing means, the method comprising the steps of:

a) forming a bumper with a central opening and a continuous ledge within the opening;

b) locating a hollow cup-shaped bumper securing means in the opening wherein the securing means engages the ledge;

c) attaching the securing means to one of a pair of spaced end members.

7. A method of forming an air spring in accordance with claim 6 wherein the bumper securing means is cup-shaped with a base at one end and a continuous lip at the opposing end.

8. A method of forming an air spring in accordance with claim 7 wherein the lip of the cup-shaped securing means engages the continuous bumper ledge.

9. A method of forming an air spring in accordance with claim 6 wherein the securing means is attached to the end member by welding.

10. A method of forming an air spring comprising a pair of spaced end members, a sleeve, a bumper, and bumper securing means, the method comprising the steps of:

a) forming a bumper with a central opening and a continuous ledge within the opening;

b) providing a cup-shaped securing means, the means having a continuous lip at the open end and a base at the opposing end;

c) inserting the securing means into the bumper opening until the lip engages the ledge;

d) welding the securing means to one of a pair of spaced end members.

11. An air spring in accordance with claim 1 wherein the continuous ledge of the bumper occurs at a height HL that is 5 to 75% of the height H of the bumper.

12. An air spring in accordance with claim 1 wherein the width WL of the continuous ledge of the bumper is 5 to 35% of the width W of the central opening of the bumper.

13. An air spring in accordance with claim 2 wherein the base of the cup-shaped securing means is formed with at least one opening.

* * * * *